United States Patent [19]

Shepherd

[11] 4,415,953
[45] Nov. 15, 1983

[54] TREE-LIKE DECORATIVE DEVICE

[76] Inventor: William C. Shepherd, 725 Palomares Ave., San Dimas, Calif. 91773

[21] Appl. No.: 282,397

[22] Filed: Jul. 13, 1981

[51] Int. Cl.³ .............................................. F21V 7/04
[52] U.S. Cl. ...................................... 362/32; 362/249; 362/450; 362/123; 362/396; 362/252; 362/249; 362/806; 362/283; D11/118
[58] Field of Search ................. 362/32, 123, 252, 806, 362/249, 450, 283, 396; D11/118

[56] References Cited

U.S. PATENT DOCUMENTS

| | | | |
|---|---|---|---|
| Re. 25,895 | 11/1965 | Paige | 362/806 X |
| D. 224,610 | 8/1972 | Dustman | D11/118 X |
| D. 258,898 | 4/1981 | Grandish | D11/118 X |
| 2,186,327 | 1/1940 | Crosser | D11/118 X |
| 3,641,335 | 2/1972 | Wall | 362/32 |
| 3,681,589 | 8/1972 | Roberts | 362/252 X |
| 3,721,815 | 3/1973 | Wall | 362/32 |
| 3,723,723 | 3/1973 | Lerner | 362/806 X |
| 3,766,376 | 10/1973 | Sadacca et al. | 362/32 X |
| 3,878,503 | 4/1975 | Martin | 362/32 X |
| 4,020,201 | 4/1977 | Miller | 362/252 X |
| 4,186,503 | 2/1980 | Fontana | D11/118 X |

Primary Examiner—Peter A. Nelson
Attorney, Agent, or Firm—Boniard I. Brown

[57] ABSTRACT

A tree-simulating illuminated decorative device, which includes an upper frame member, a plurality of light-conducting rod shaped elements having first axial extremities carried on an upper frame member, a lamp mounted proximate to the upper frame member for illuminating the first axial extremity of each of the rod shaped elements, and a plurality of sprays of optic fibers. A spray is in light communicating relationship with each of the rod shaped elements. In another form of the invention a tree-simulating illuminated decorative device includes an upper frame member and a plurality of light-conducting bough members, each having a first axial extremity fixed to the upper frame member. The locus of the connections between each of the light-conducting bough elements and the upper frame members may be a circle. The light-conducting elements may extend both downwardly and radially outwardly from the upper frame member. The light-conducting elements incude at least some steps defined on the side thereof nearest to an axis extending through the geometric center of the circular locus.

26 Claims, 10 Drawing Figures

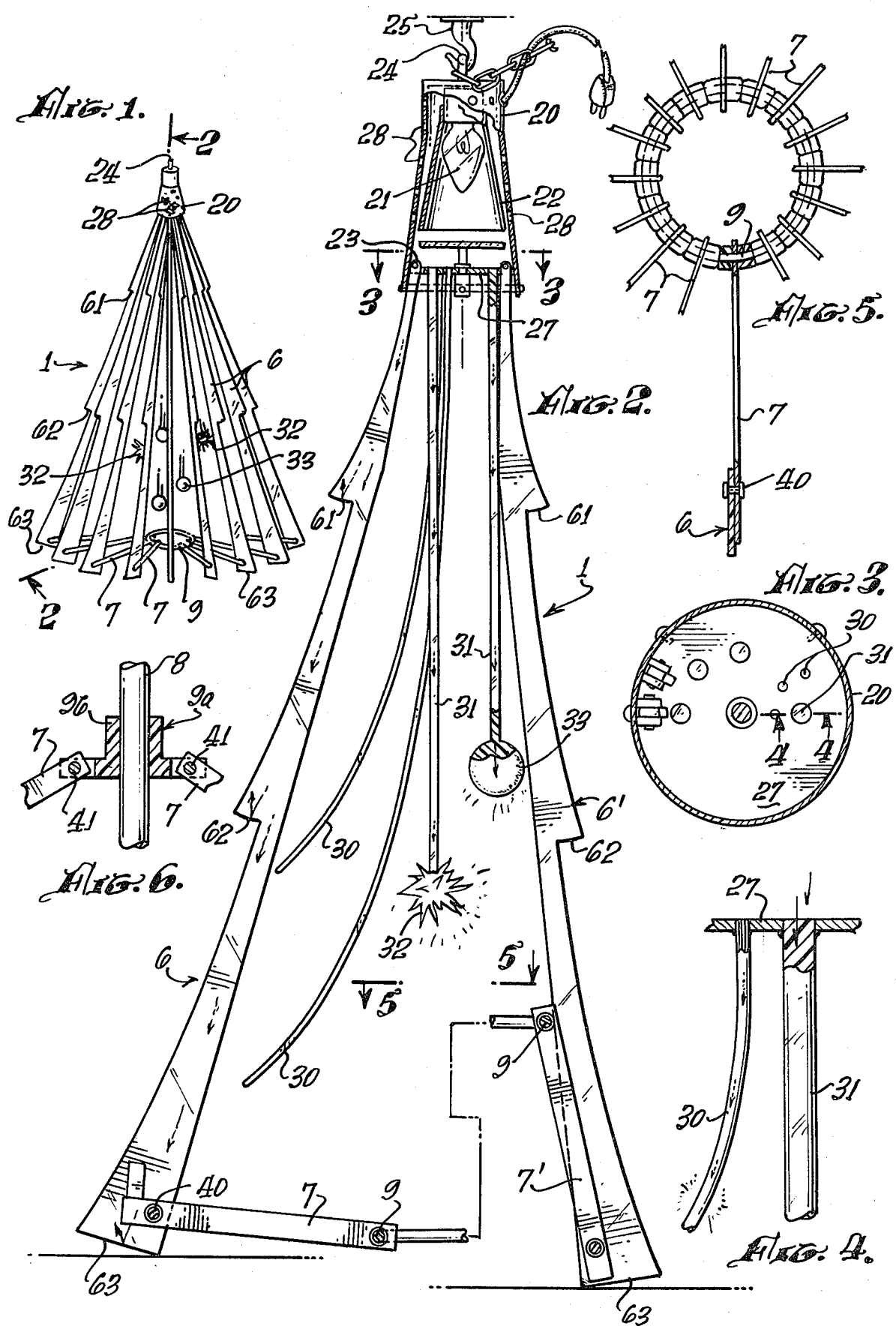

TREE-LIKE DECORATIVE DEVICE

BACKGROUND OF THE INVENTION

The invention relates to decorative apparatus and particularly to apparatus for simulating the appearance of cut decorated evergreen trees. A trend away from the use of cut evergreen trees in holiday decoration has led to development of various artificial trees, tree-like simulations, and more abstract decorations that suggest trees or plants.

The prior art includes various artificial tree structures, including some which have used fiber optics. Such apparatus includes those shown in U.S. Pat. Nos. 3,465,139; 3,766,376; 3,641,335; 3,677,867; 4,025,779; 4,060,722; and 4,097,917. Prior structures and devices have not been wholly satisfactory, in part, because they have not created realistic and/or aesthetically appealing appearances.

Another object of the invention is to provide apparatus which is readily transported and stored.

Another object of the invention is to provide apparatus which is simple, particularly with respect to the portions which illuminate the apparatus, and which will use relatively little electrical power.

SUMMARY OF THE INVENTION

The foregoing objects and other objects and advantages which shall become apparent from the detailed description of the preferred embodiment are attained in a tree-simulating illuminated decorative device which includes an upper frame member, a plurality of light-conducting rod shaped elements having a first axial extremity carried on the upper frame member, a lamp mounted proximate to the upper frame member for illuminating the first axial extremity of each of the rod shaped elements and a plurality of sprays of optic fibers. One of the sprays is carried in light communicating relationship with each of the rod shaped elements.

The plurality of light-conducting rod shaped elements may include at least one element having a first length, at least a second element having a second length which is greater than the first length and at least a third element having a third length which is greater than the second length. The apparatus may further include at least a fourth rod shaped element having a fourth length which is greater than the third length. The sprays may each have a plurality of optic fibers disposed with the axial extremities thereof in end abutting relationship to a common imaginary plane and also the apparatus may further include a first sleeve disposed around the optic fibers at the first axial extremity. The apparatus may further include a second sleeve which is light conductive and which may be dimensioned for engagement with both the first sleeve and the exterior surface of the cooperating rod shaped member. The first sleeve may be metallic.

A plurality of light-conducting generally planar elements each may have a first axial extremity fixed to the upper frame member. The locus of the connections between each of the plurality of light-conducting elements and the upper frame members may be a circle. The light-conducting elements may extend both downwardly and radially outwardly from the upper frame member and the light-conducting elements may include at least some steps on the side thereof nearest to an axis extending through the geometric center of the circular locus. The light-conducting generally planar elements each may include a plurality of step shaped surfaces disposed in a side thereof most remote from the axis.

In another preferred embodiment, a tree-simulating illuminated decorative device may include an upper frame member, a plurality of light-conducting elements each having a first axial extremity fixed to the upper frame member, and a locus of the connections between each of the plurality of light-conducting elements and the upper frame members is a circle. The light-conducting elements may extend both downwardly and radially outwardly from the upper frame member. The light-conducting elements may include at least some notches on the side thereof nearest to an axis extending through the geometric center of the circular locus. The light-conducting elements each may include a plurality of step shaped surfaces disposed in a side thereof most remote from the axis.

The apparatus may further include a generally circular lower frame member having a plurality of generally tangentially extending arms. Each of the arms may be pivotally mounted to the lower frame member and to one of the light-conducting elements. The lower frame member may include a plurality of circumferentially disposed step shaped surfaces, each accommodating one of the arms. The arms each may include means for limiting the pivotal travel thereof with respect to the lower frame member beyond a predetermined angular relationship. The means for limiting may include a generally rounded corner on the arm proximate to the pivotal connection between the arm and the step shaped circumference of the lower frame member. Each of the arms may also be pivotally connected to one of the light-conducting memebers. The lower frame member is movable along the axis to a position closer to the upper frame member wherein the arms may be disposed in generally aligned relationship to the axis. A plurality of light-conducting rod shaped elements may be carried on the upper frame member.

A plurality of optic fibers may be disposed in light-communicating relationship with each of the rod shaped elements. The plurality of light conducting rod shaped elements may include at least one having a first length, at least one having a second length which is greater than the first length, and at least a third having a third length which is greater than the second length. The sprays each may have the plurality of optic fibers disposed with the axial extremities thereof in end abutting relationship to a common imaginary plane. The apparatus may further include a first sleeve disposed around the optic fibers at the first axial extremity. The apparatus may further include a second sleeve which is light conductive and which may be dimensioned for engagement with both the first sleeve and the exterior surface of the cooperating rod shaped member. The upper frame member may include a reflector for the lamp means. A suspension fitting may be disposed at the top thereof.

BRIEF DESCRIPTION OF THE ACCOMPANYING DRAWING

FIG. 1 is a simplified general perspective view of a decorative device according to the invention;

FIG. 2 is an enlarged sectional view along line 2—2 of FIG. 1;

FIG. 3 is a sectional view along line 3—3 of FIG. 2;

FIG. 4 is a sectional view along line 4—4 of FIG. 3;

FIG. 5 is a sectional view along line 5—5 of FIG. 2;

FIG. 6 is a detailed sectional view of a modified form of the invention;

FIG. 7 is a partially schematic elevational view of another preferred form of the invention which illustrates the manner in which a lower frame member is movable between first and second positions;

FIG. 8 is a fragmentary enlarged section taken along the line 8—8 in FIG. 7;

FIG. 9 is an exploded view of a portion of the structure illustrated in FIG. 8; and FIG. 10 is a sectional view taken along the line 10—10 of FIG. 7.

DESCRIPTION OF THE PREFERRED EMBODIMENTS

Referring first to FIG. 1, the main body of the decorative device is indicated generally at 1, and is made mainly of a set of circumferentially spaced, generally straight, slat-like bough elements 6, disposed generally as elements of a cone having its apex adjacent a lamp housing 20 at the top of the device. In the form of the invention illustrated, there are 16 such bough elements disposed evenly around a circle; this number is obviously not restrictive.

Each bough element 6 preferably defines large steps, as at 61, 62 to suggest the outline of an evergreen tree. The elements 6 are all substantially similar. They are made of transparent material such as molded methyl methacrylate. Their upper ends are exposed to a lamp 21 inside the lamp housing 20. Light is conducted down the bough elements 6, and causes selected areas of them to glow, as at the serrated surfaces or notches 61, 62 and their lower ends 63. Other areas may be made rough or umpolished to glow as desired, by reduction of internal reflection. The bough elements 6 and the other decorative elements may be tinted in suitable colors.

The lower end portion of each bough element 6 is propped outward by a respective rib 7, whose inner end is pivoted to a central ring-like element or lower frame member 9. The whole body or assembly 1 may be folded together for shipping or storage by folding the bough elements inward like the legs of a tripod.

Appropriate ornaments or ornamental elements 32, 33 of translucent material are preferably provided at the ends of light-conducting rods, as shown in FIGS. 1 and 6. These may preferably be tinted in suitable colors.

A suitable eye or suspension fitting 24 is provided on top of the lamp housing 20 for hanging the device, as from a ceiling. FIG. 2 shows the construction in more detail. The eye 24 may attach to a suitable hook 25 on an elevated portion of a structure such as a ceiling.

A lamp housing 20 extends downward from eye 24. The housing is preferably provided with a number of ventilating holes as at 28, which may be disposed to give a star-like decorative effect. A suitable lamp 21, preferably of the internal reflector type, has a reflector 22 directing the light downward. Below the reflector 22 may be interposed a disc of heat-absorbing glass 26 such as is used in projectors.

Secured inside the lower open end of the lamp housing 20 is an upper frame member 27 which provides pivotal support to the upper end of each bough element 6, as at 23, in FIG. 3.

Also secured into the upper frame member 27 are the ends of a suitable number of transparent optical light-conducting rods 31 and fibers 30. The smaller fibers 30 preferably extend downward and outward to provide points of light at their tips, conducted from the lamp 21.

The larger optical rods 31 may terminate in transparent or translucent ornametal elements or ornaments, such as a ball 33 or a star 32, which glow from the conducted light. Fibers 30 may be of the plastic material sold by the DuPont company under the trade name "Crofon."

The central ring-like element 9 and ribs 7 are best shown in FIGS. 2 and 5. The ribs 7, 7 are pivoted at their ends as at 40, 41, connecting each bough element 6, 6, to the ring-like element 9 on rod 8. When the bough elements are folded inward (as in a tripod or an umbrella), the ring 9 moves upward. The right-hand portion of FIG. 2 shows a bough 6' in the folded position, with the rib 7' extending approximately vertically and the ring displaced upwardly.

FIG. 3 is a section looking down in direction 3—3 of FIG. 2, showing the top of header 27 with the ends of optical fibers 30 and rods 31 secured in and through it. They may be glued in place. The header 27 is generally disc-shaped.

FIG. 6 shows a modification of the central ring-like element in a sectional detailed view. The ring-like element 9 of FIGS. 1, 2 and 5 is replaced by a collar-like element 9a, the circumference of which is provided with radial slots into which the inner ends of ribs 7 are pivoted as at 41, 41, in the same manner as with element 9. However, the modification of FIG. 6 additionally provides a central axial support rod 8. The modified element 9a has a central bore and a sleeve portion 9b which is slidable up and down along the central rod 8, in the manner of an umbrella. The upper end of rod 8 (not shown), is preferably attached to the central portion of the header 27. This modification provides a more rigid structure where desired. The upper end portion of rod 8 may extend through the header 27 (FIG. 2).

FIGS. 7 to 10 illustrate another preferred embodiment of the invention. An upper frame assembly comprises a top member 70 secured to a mounting plate or disc 71 by screws, as shown. Lamp 72, preferably of the internal reflector type, is mounted in an electrical socket mounted in the frame assembly. Carried by the mounting plate or frame member 70 are a plurality of rods 74, 76, 78 and 80 which are fabricated of a transparent material such as methyl methacrylate. These rods are, as shown, of different lengths. For simplicity, only four such rods have been shown. Each of these rods carries a spray of a plurality of optic fibers. The lengths of the rods 74–80 in one embodiment is between two and twenty-four inches. Typically, the apparatus in accordance with the invention will have more of the rods 75–80 and typically will have two rods of each of the various lengths. For simplicity, however, these additional sprays 82 and rods 74–80 have been omitted from the drawing.

A plurality of generally planar light conducting members or bough elements 84 are fixed to the upper frame member 71 at pivots 85. The locus of the connections of member 84 to the upper frame member 70 is a circle. Because the members 84 extend downward and radially outward, as is apparent from FIG. 7, the general appearance of a tree is produced. This appearance is accentuated by the presence of steps or notches 87 which are defined on the side of the members 84 most remote from the geometric axis of the assembly. Disposed on the sides of the members 84 nearest to the axis of the assembly are a plurality of notches or serrations 89 which are provided to diffuse and reflect light to enhance the aesthetic characteristics of the assembly.

Pivotally connected to each member 84 by means of pivots 90 is an arm 86 which is also connected by a pivot 90 to a lower frame member 88. The lower frame member 88 is generally circular as is apparent from FIG. 10. The circumferential surface thereof is step shaped. As best seen in FIG. 7, the axial extremity of each arm 86, which cooperates with the step or teeth of the circumferential surfaces of the lower housing member 88, has a curved surface which allows relative pivotal motion between the arm 86 and the lower housing member 88. More specifically, the lower housing member 88 may move to the position indicated by the numeral 88' wherein the members 84 assume a generally parallel relationship to the axis of the assembly. The folded position of the member 84', the arm 86', and the lower frame member 88', is indicated by the broken line representations thereof in FIG. 7. This alternate position serves to permit easy storage and transport of the apparatus.

It has been found that the apparatus creates an aesthetically pleasing appearance in that light from the lamp 72 passes through the molded methyl methacrylate members 84 via the serrations 89 and the steps 87. Light also passes through the rods 74–80 and into the optic fibers in the spray 82.

The manner of connections of the rod shaped members 74–80 to the sprays 82 is further illustrated in FIGS. 8 and 9. Ordinarily, a plurality of optic fibers are disposed in axially aligned and abutting relationship with a rod, such as 74 (illustrated in FIG. 8) with a metallic sleeve 92 disposed thereabout to prevent any movement out of this bundle of optic fibers. A flexible plastic tubine member 94 is disposed with the interior thereof engaging both the plastic rod 74 and the outer circumference of the sleeve 92.

It will thus be seen that the apparatus in accordance with the invention is particularly aesthetically appealing, and that it may be readily transported and stored. The apparatus may also be manufactured in a relatively simple and efficient manner.

The invention has been described with reference to its illustrated preferred embodiment. Persons skilled in the art of constructing tree-like decorative devices may, upon exposure to the teachings herein, conceive variations in the mechanical development of the components therein. Such variations are deemed to be emcompassed by the disclosure, the invention being delimited only by the appended claims.

I claim:

1. A tree-simulating illuminated decorative device which comprises:
an upper frame member,
a plurality of light-conducting elements each having a first axial extremity connected with said upper frame member,
lamp means mounted proximate to said upper frame member for illuminating said first axial extremities of said elements,
certain of said light-conducting elements defining notches in at least one edge thereof to glow with light conducted by the elements, and
means pivotally connected to lower end portions of the elements for retraction of the elements to provide a folded configuration of the decorative device.

2. The apparatus as described in claim 1, wherein:
said plurality of light-conducting rod shaped elements include at least one element having a first length, at least a second element having a second length which is greater than said first length, and at least a third element having a third length which is greater than said second length.

3. The apparatus according to claim 1, wherein:
the notches are serrations.

4. The apparatus as described in claim 3, wherein:
each of said sprays has said plurality of optic fibers disposed with the axial extremities thereof in mutally spaced relation; and
said apparatus further including a first sleeve disposed around said optic fibers at said first axial extremity.

5. The apparatus as descrived in claim 4, wherein:
said apparatus further includes a second sleeve which is light conductive and which has an internal bore dimensioned for engagement with both said first sleeve and the exterior surface of the cooperating rod shaped member.

6. The apparatus as described in claim 5, wherein:
said first sleeve is metallic.

7. The apparatus according to claim 1, wherein:
the notches are defined in an edge portion of the element facing outwardly of the decorative device.

8. The apparatus according to claim 1, wherein:
the notches are defined in an edge portion of the element facing inwardly of the decorative device.

9. The apparatus according to claim 1, and further including:
a plurality of light conducting rod-shaped elements depending from the upper frame member.

10. The apparatus according to claim 9, and further including:
respective pluralities of optic fibers in light-communicating relationship with certain respective ones of the rod-shaped elements and the lamp means.

11. The apparatus as described in claim 1, wherein:
said apparatus further includes a generally circular lower frame member; and
a plurality of generally tangentially extending arms extending from said lower frame member, each of said arms being pivotally mounted to said lower frame member, each of said arms being pivotally mounted to said lower frame member and to one of said light-conducting elements.

12. The apparatus as described in claim 11, wherein:
said lower frame member includes a plurality of circumferentially disposed step shaped surfaces, each accommodating one of said arms.

13. The apparatus as described in claim 12, wherein:
said arms each include means for limiting the pivotal travel thereof with respect to said lower frame member beyond a predetermined angular relationship.

14. The apparatus as described in claim 13, wherein:
said means for limiting includes a generally rounded corner on said arm proximate to the pivotal connection between said arm and the step shaped circumference of said lower frame member.

15. The apparatus as described in claim 14, wherein:
each of said arms is also pivotally connected to one of said light-conducting members.

16. The apparatus as described in claim 15, wherein:
said lower frame member is movable along said axis to a position wherein it is closer to said upper frame member and wherein said arms are disposed in generally aligned relationship to said axis.

17. The apparatus as described in claim 16, and further including:
a plurality of light-conducting rod shaped elements carried on said upper frame member.

18. The apparatus as described in claim 17, further including:
a plurality of optic fibers disposed in light-communicating relationship with each of said rod shaped elements.

19. The apparatus as described in claim 18, wherein:
said plurality of light-conducting rod shaped elements include at least one having a first length, at least one having a second length which is greater than said first length, and at least a third having a third length which is greater than said second length.

20. The apparatus as described in claim 19, wherein:
each of said sprays has said plurality of optic fibers disposed with the axial extremities thereof in mutually spaced relation; and
said apparatus further including a first sleeve disposed around said optic fibers at said first axial extremity.

21. The apparatus as described in claim 20, further including:
a second sleeve which is light-conductive and which is dimensioned for engagement with both said first sleeve and the exterior surface of the cooperating rod shaped member.

22. The apparatus as described in claim 21, wherein:
said upper frame member comprises a reflector for said lamp means.

23. The apparatus as described in claim 22, and further including:
a suspension fitting disposed at the top thereof.

24. The apparatus according to claim 1, wherein:
said means pivotally connected to the elements are articulating arms connected with lower portions of the elements for maintaining the elements in spaced array and for folding the elements together to a collapsed configuration for storage and transport.

25. The apparatus according to claim 24, and further including:
a lower frame member pivotally connected with each of the arms and movable to a position closer to upper frame member to move the arms to retracted positions.

26. The apparatus according to claim 1, wherein:
the notches are step-shaped.

* * * * *